Aug. 18, 1925.
A. E. McCOLL
1,550,215
PROTECTIVE DEVICE FOR ALTERNATING CURRENT ELECTRIC SYSTEMS
Filed Oct. 25, 1919
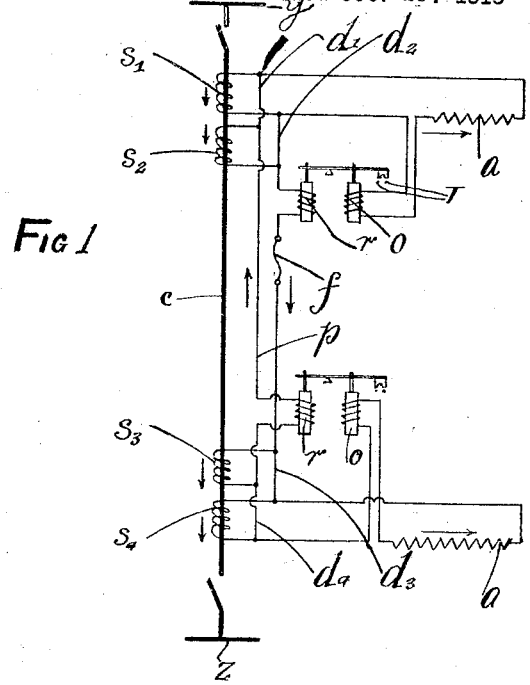
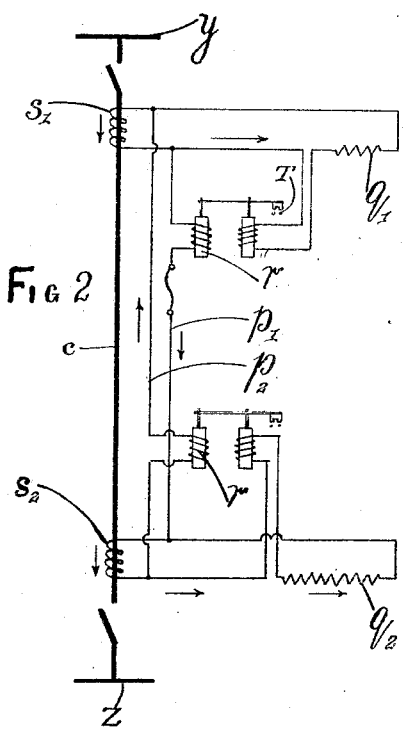
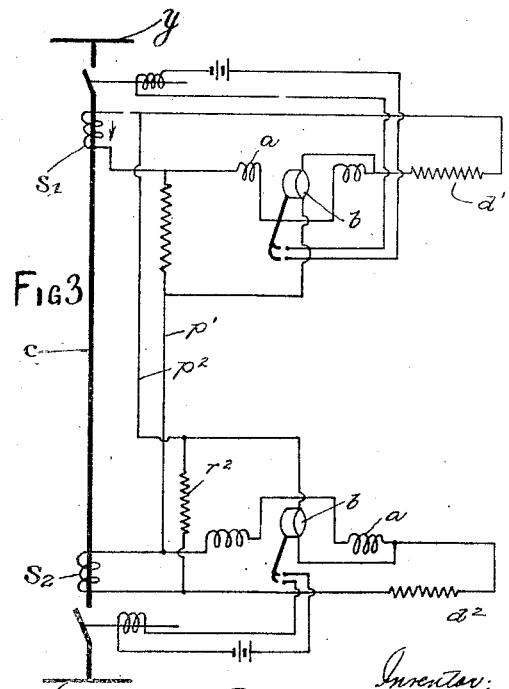
Inventor:
Albert Edward McColl Patented Aug. 18, 1925.

1,550,215

UNITED STATES PATENT OFFICE.

ALBERT EDWARD McCOLL, OF DUMBARTON, SCOTLAND, ASSIGNOR OF ONE-HALF TO THE GENERAL ELECTRIC COMPANY LIMITED, OF BIRMINGHAM, ENGLAND.

PROTECTIVE DEVICE FOR ALTERNATING-CURRENT ELECTRIC SYSTEMS.

Application filed October 25, 1919. Serial No. 333,179.

(GRANTED UNDER THE PROVISIONS OF THE ACT OF MARCH 3, 1921, 41 STAT. L., 1313.)

*To all whom it may concern:*

Be it known that I, ALBERT EDWARD Mc-COLL, a citizen of the United Kingdom of Great Britain and Ireland, and residing at 1 Levengrove Terrace, Dumbarton, Scotland, have invented certain new and useful Improvements in Protective Devices for Alternating-Current Electric Systems (for which I have filed application in Great Britain and Ireland, No. 16,203, October 5, 1918), of which the following is a specification, such as will enable others skilled in the art to which it appertains to make and use the same.

This invention relates to improved means of protecting alternating current electric supply systems and has for its object a greater stability and a higher sensitiveness than has hitherto been obtainable.

Protective devices which employ pilot wires are known according to the systems described in British specifications 11364/1904, 3896/1904 and 15796/1904. The systems described in the said letters patent employ, between the two ends of the protected circuit, a balance, which may be either of electromotive force, current or magnetic. In practice a balance such as described in the said letters patent has serious limitations when applied to the largest power systems. These limitations consist variously—of capacity current in the pilot wires which connect the transformers situated at the two ends of the protected cable or circuit; the tendency of the current transformers of the protective gear to develop differing characteristics under abnormal conditions; the tendency of the circuits to be out of balance due to a difference in resistance of the component parts. As already mentioned these conditions place serious limitations on the application of such protective arrangements on the largest power systems.

Advances in the art have been made according to German Patent No. 220804/1909 which have for their object the overcoming of the troubles introduced by capacity current in the pilot wires. This advance, however, has not eliminated the weakness inherent in a system which employs current transformers which may develop considerable differences when the magnetic induction per square centimetre has been raised to high values. These high values of magnetic induction may be obtained when a protected circuit, otherwise healthy, has to carry momentarily current several hundred per cent in excess of its normal value. Under such conditions the protective gear operates when it should not operate and healthy apparatus and circuits are disconnected needlessly.

Now, the present invention employs pilot wires and has for its object the overcoming of the previously mentioned limitations by permitting a certain latitude for unbalancing between the transformers placed at each end of the protected apparatus or circuit. This latitude is obtained by forcibly preventing the protective devices from operating until the unbalance between the two ends of the said apparatus or circuit exceeds a certain definite percentage. Various means of obtaining this latitude are shown in my co-pending application Serial No. 348676 Patent No. 1,393,228, dated October 11, 1921. This definite percentage is based on the input and output of the protected circuit and has a constant value relative to the output of the feeder, as, for example, a feeder carrying 100 amperes biassed to the extent of 10% and protected by the protective means embodied in the invention would not be disconnected until the input exceeded the output by 10%, i. e., 110 amperes would flow in at one end and 100 amperes would flow out at the other end.

In the case where the said feeder had momentarily to carry, say, 1000 amperes due to a fault on another portion of the network the unbalance necessary to operate the protective device would now have to exceed 100 amperes or 10% of the input. It will thus be evident that multiplication of the differences between the transformers at the two ends of the protected circuit is automatically counterbalanced by the increased holding-off power of the relays. The invention has further for its object the useful employment of the load current which normally circulates in the secondary winding of the series transformers by causing a high state of magnetization in the relays, this magnetization being additive to that produced by the fault current. By these means an increased degree of sensitiveness is obtained in the relays and operation is obtained with a small additional expenditure of energy by the series transformers.

To describe the invention—

Figures 1 and 2 of the drawings show applications of the invention employing beam balance relays;

Figure 3 shows a further application of the invention employing dynamometer type relays.

Referring to Fig. 1 which illustrates a further application of the biassed principle—$c$ represents a cable or circuit with current transformers $s_1$, $s_2$, $s_3$ and $s_4$ placed at the two ends thereof. Duplicate circuits are indicated by the resistances $a$. $r$ and $o$ represent respectively the restraining and operating coils of a beam relay. $p$ represents the pilot wires connecting the current transformers at each end of the cable. Under normal conditions of current flow through the feeder $c$ the transformers $s_1$ and $s_4$ circulate their currents through the operating coil $o$ of each relay and the duplicate circuit $a$ at each end of the feeder. The current transformers $s_2$ and $s_3$ circulate their current along the pilot wires $p$ and through one another, this current traversing the coil $r$ of each relay. Resistance of each duplicate circuit $a$ is adjusted to have an ohmic value equal to that of one pilot wire. As the transformers $s_1$ and $s_4$ have the same current capacity as $s_2$ $s_3$ it will be evident that equal currents flow normally through the coils $r$ and $o$ of each relay, thus obtaining a condition of inaction in the relay due to a similarity of pulls on the respective plungers which enter coils $r$ and $o$.

However, to obtain the degree of stability which is the feature of my protective device I increase the leverage from the fulcrum to the plunger sucked down by the restraining coil $r$ by perhaps 10% over the leverage accorded to the operating coil $o$ of each relay. Alternative means may be employed to obtain a similar effect. For example, additional turns to the extent of 10% may be wound on the coil $r$ of each relay. This will give a 10% greater pull to these coils than is accorded to the coils $o$ of each relay. A further alternative means to produce a similar result may consist of increasing the resistance of the duplicate circuits $a$ over the resistance of the corresponding pilot wire by perhaps 10%. This latter condition will result in 10% greater current flowing through the coil $r$ of each relay and over the pilot wires than flows through the operating coils $o$ and the duplicate circuits $a$. In the event of the feeder $c$ becoming faulty so that more current flows in at the end $y$ than flows outward at the end $z$ the condition of balance between the transformers $s_1$ $s_2$ and the transformers $s_3$ $s_4$ is upset and the transformer $s_2$ will send a portion of its output through the operating coil $o$ of the relay at the end $y$, thence through the duplicate circuit, returning by the connection $d_1$. This current will develop a greater pull on the coil $o$ than obtains on the coil $r$, the relay tipping over and completing the circuit through the tripping coil (not shown) of the main controlling switch. The tripping circuits T are not shown in detail as these may be connected in a manner well understood which does not form part of the invention.

Now, due to the 10% greater pull which was originally given to the coil $r$ of each relay it will be evident that the current in transformers $s_1$ and $s_2$ must increase over that flowing in $s_3$ and $s_4$ by 10% before the relay is caused to tip over. In the case where the fault in the cable $c$ should be of such dimensions to demand a reversed flow into the cable from the end $z$ the current transformers $s_3$ $s_4$ will now oppose the transformers $s_1$ $s_2$ with the result that each pair of transformers will divert its current through the operating coil $o$ of its relay and the duplicate circuit $a$. By introducing a fuse $f$ into the pilot wires $p$ the relays may be made to operate on ordinary overloads. The blowing of this fuse will interrupt the pilot wire current causing each set of transformers to divert its current through the operating coil of its relay the latter overbalancing and energizing the trip coil of the main controlling switch.

Fig. 2 illustrates a modification of the arrangement shown in Fig. 3. In this modification I place a transformer $s_1$ and $s_2$ at each end of the protected cable $c$. These transformers are connected to circulate half of their current over the pilot wires $p_1$ and $p_2$ and the other half through the duplicate circuits $q_1$ and $q_2$. Under normal conditions the condition of balance will be maintained between the coils $r$ and $o$ of each relay. However, I give the desired stability in this arrangement in a manner similar to that described with reference to Fig. 3; that is, I increase the leverage accorded to the plunger of the restraining coil over that accorded to that of the operating coil or I increase the proportion of turns on the restraining coil $r$ over that forming the operating coil $o$. A similar effect may be obtained by other well known means. The operation of this arrangement will be understood from the description given with reference to Fig. 3, the operating principles being exactly similar in each case. One feature which it is desired to emphasize in connection with arrangements shown in Figs. 1 and 2 is that the normal load energy which circulates in the current transformers is employed to produce a high state of magnetization in the plungers of each relay. In a relay of this type the pull on the plungers increases roughly as the square of the current. Consequently, if I add a small proportion of fault current to the normal load current circulating through the coils of the relay I immediately produce a very large differential pull which causes the relay to tip over immediately the percentage bias has been exceeded by a small amount.

A further modification of the invention is shown in Fig. 3. $c$ represents a protected cable or circuit. $s_1$ and $s_2$ represent series transformers. $a$ and $b$ represent respectively fixed and moving coils of the dynamometer relay. Duplicate circuits are indicated by the resistances $d_1$ and $d_2$.

$p_1$ and $p_2$ represent pilot wires connecting the transformers $s_1$ and $s_2$ together. $r_1$ and $r_2$ represent resistances connected in series with the pilot wires $p_1$ and $p_2$.

By way of example in this particular arrangement it will be assumed that the resistance of the duplicate circuits equals that of the pilot wires, so that half the transformer output flows in each circuit. If the ohmic values of the element $a$ of each relay and the resistances $r_1$ and $r_2$ be equal, it will be found that all the current of the duplicate circuits flows through said element $a$ and all the pilot wire current through the resistances $r_1$ and $r_2$. As each path has equal ohmic values and is traversed by equal current values, it will be evident that the element $b$ of each relay is connected across equipotential points and therefore normally inactive.

However, to obtain the necessary bias, I make the ohmic value of the resistances $r_1$ and $r_2$ slightly greater than that of the element $a$. The effect of this is to cause a portion of the pilot wire current to flow through the element $a$ and by way of the element $b$, as indicated by the arrows, into the pilot wire circuit. The direction of flow through element $b$ is such that the relay remains biassed. If now, increased current flows into the feeder, say at the end $y$, due to a fault, the increased current which flows into the duplicate circuit $d$ divides itself between the two parallel paths, that is to say, the element $a$ and the other path offered by the resistance $r_1$ and the element $b$. The direction of current flow through the element $b$ will now be in the reverse direction to that which formerly gave normal bias, the relative polarity of the element $a$, however, remaining unchanged; reversal of current flow through one element constituting the condition necessary for operating the relay.

It will be understood that with any of the arrangements described, the duplicate circuits may have an ohmic value which is greater than, equal to or less than that of the pilot wires, the current values in the respective circuits being so proportioned that substantially the same potential drop is obtained in each circuit. Relays of induction type may be used wherein a movable disc is caused to revolve in one direction by the restraining coil, such movement, however, being limited by a stop, the operating coil tending to give movement in the other direction such that completion of this latter movement actuates the tripping circuit of the controlling switch.

I claim:

1. In combination an alternating current circuit with current transformers at each end thereof, mechanically balanced relays, resistances forming duplicate circuits and pilot wires over which current normally circulates, said mechanically balanced relay having one winding connected in series with duplicate circuit one other winding being connected in pilot wire circuit so that under normal circumstances percentage bias is obtained by causing current to spill over from duplicate to pilot wire circuits, said spill over current being obtained by making the resistance of duplicate circuits greater than that of the corresponding pilot wire.

2. In combination an alternating current circuit, series transformers at each end thereof, pilot wires connecting said series transformers together, resistances forming duplicate circuits, resistances in circuit with the pilot wires, and relays having a plurality of coil windings, one coil of said relays being connected in series with the duplicate circuit and the other coil of said relays being connected between the duplicate circuit and the resistance in series with the pilot wires.

In witness whereof I have hereunto set my hand.

ALBERT EDWARD McCOLL.